July 21, 1953  L. M. WILFORD  2,645,977
SAFETY SIGNAL REFLECTOR FOR VEHICLES
Filed Sept. 30, 1949
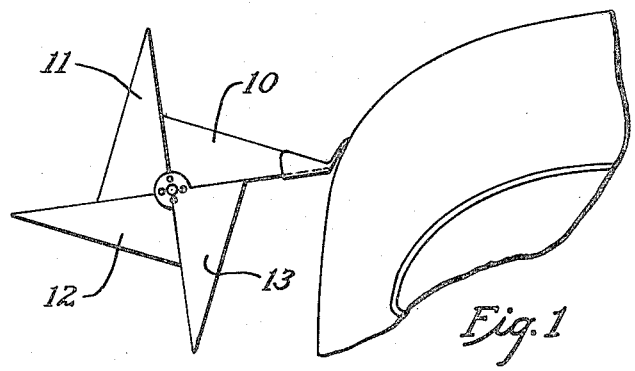
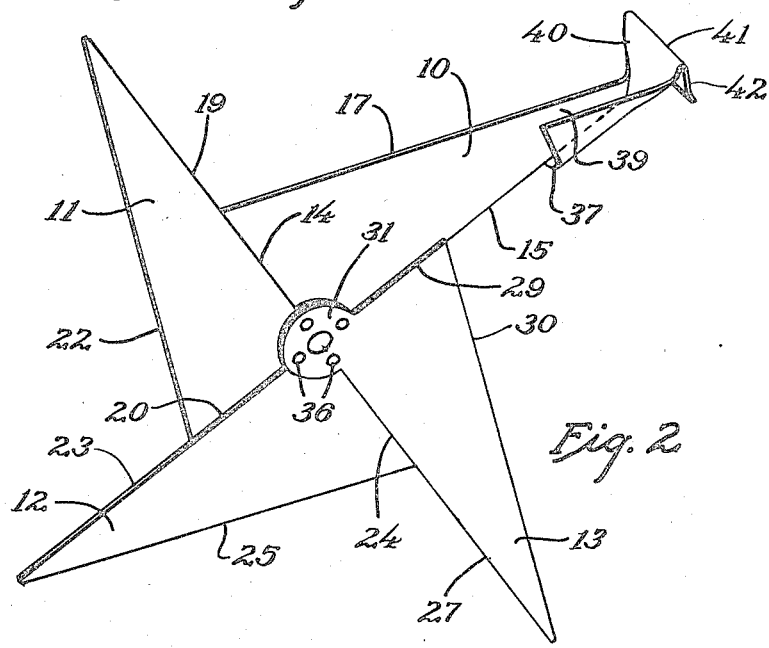
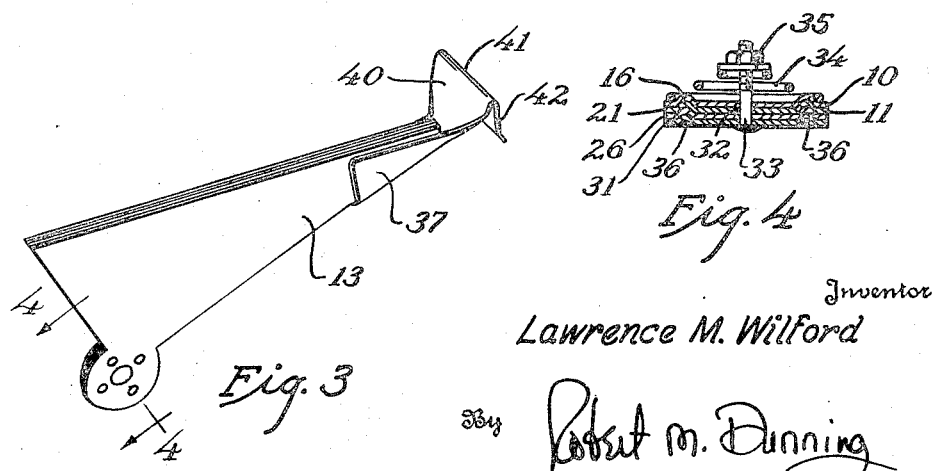
Inventor
Lawrence M. Wilford
By Robert M. Dunning Patented July 21, 1953

2,645,977

UNITED STATES PATENT OFFICE 2,645,977

SAFETY SIGNAL REFLECTOR FOR VEHICLES

Lawrence Mertin Wilford, St. Paul, Minn., assignor of one-half to Alfred E. Hulet, St. Paul, Minn.

Application September 30, 1949, Serial No. 118,974

3 Claims. (Cl. 88—81)

My invention relates to an improvement in safety star warning signal and deals particularly with a device designed for use to warn motorists of an approaching danger.

Many persons have been killed and injured in working upon cars parked alongside of a highway. It is difficult for motorists approaching on a highway at a high rate of speed to see a parked car or the like at night. This is particularly true as the persons working on the car may be standing behind the car so that the lights of the parked car can not be seen. The present device is designed as a danger signal to warn approaching motorists of the presence of the parked car.

A feature of the present invention lies in the provision of a danger signal comprising a star shaped body of unusual form which is easily recognizable at night and which is preferably coated with a reflective surface or a luminescent surface. The device is placed on the car to project outwardly therefrom toward the center of the highway so that an approaching motorist may readily note the location and position of the parked vehicle.

A feature of the present invention lies in the particular shape of the signal. While the shape may be changed to a substantial extent without destroying the usefulness of the device, the particular shape disclosed has been found unusually distinctive and clearly visible. The star shaped body appears to point away from the parked vehicle, thus providing an unusually effective device.

An added feature of the present invention lies in the fact that the object is provided with a hook shaped end engageable over the edge of the vehicle door. Most automobile doors are provided with an outer panel which projects beyond the remainder of the door along the upper edge thereof. My device may be hooked over this upwardly projecting flange in such a manner that when the door is closed the signal will be securely locked in place. The hook shaped support acts to hold the signal projecting outwardly from the vehicle so as to be spaced therefrom throughout most of its periphery.

An added feature of the present invention lies in the fact that the signal may be folded up and may be readily carried in the vehicle. The various points of the star are so shaped as to fold into parallel side by side relation so that it may be stored in a small space such as the glove compartment of a car.

A further feature of the present invention lies in the provision of a means for holding the various points of the star in folded condition or in extended position. I provide a means of interengaging the various foldable elements so as to resist pivotal movement when desired.

These and other objects and novel features of my invention will be more clearly and fully set forth in the following specification and claims.

In the drawings forming a part of my specification:

Figure 1 is a rear elevational view of a portion of a car showing the manner in which the signal projects therefrom.

Figure 2 is a perspective view of my danger signal in unfolded or extended position.

Figure 3 is a perspective view of my danger signal in folded condition.

Figure 4 is a sectional view through the connection between the points of the star, the position of the section being indicated by the line 4—4 of Figure 3.

My device is extremely simple in form and is produced by a series of elements of substantially similar shape. As illustrated in the drawings my device includes four foldable star point portions indicated in general by the numerals 10, 11, 12 and 13 respectively. These star points are generally similar in outline construction. The star point 10 is provided with two right angularly arranged side edges 14 and 15 which are provided with a disc-like projection 16 at the intersection thereof. The disc shaped portion 16 comprises three-fourths of a disc or circular area having its center at the point of intersection of a continuation of the edges 14 and 15. The edge 15 is of considerably greater length than the edge 14 and the third edge 17 of the star point is arranged at an acute angle to the edges 14 and 15. In other words, the star point 10 is generally triangular in shape and has a rounded projecting portion at the intersection between two right angularly arranged sides.

The star point 11 is provided with two sides 19 and 20 which are arranged at right angles. A disc-like projection 21 having its center at the intersection of continuations of the edges 19 and 20 is arranged in registry with the disc-like projection 16 of the star point 10. The third edge 22 is arranged at an acute angle to both edges 19 and 20 and completes the triangular body.

The star point 12 is provided with triangularly arranged edges 23, 24, and 25. Two of these edges 23 and 24 are arranged at right angles. A rounded projection 26 having its radius of curvature at the intersection of the edges 23 and 24 is provided in registry with the rounded projections 16 and 21.

The star point 13 is generally triangular, being bounded by angularly arranged side edges 27, 29 and 30. The edges 27 and 29 are arranged at substantially right angles and a rounded projection 31 is provided at their intersection. The center of curvature of the rounded projection 31 is at the intersection of the edges 27 and 29. The projection 31 is in registry with the other rounded projections 26, 21 and 16.

All of these rounded projections are provided with an aperture 32 therethrough for accommodation of a pivot bolt or rivet 33. In preferred form a spring 34 is provided between the projection 16 and one enlarged end 35 of the fastening pivot 33 so as to urge the various rounded portions of the device into surface contact.

Each of the projections 16, 21, 26 and 31 is provided with four equally spaced similar indentations 36. These indentations 36 are concave on one side of the disc-like portions and convex on the other side thereof. The various projections extend into the indentations of the next adjacent foldable element so as to resist relative pivotal movement between the fold elements when the indentations are in registry. The spring 34 applies the necessary force to hold the indentations in nested condition.

A lip 37 projects laterally from the edge 15 of the star point 10 and is bent to provide a pocket 39 between the lip 37 and the star point 10. The end of the lip 37 is substantially parallel to the surface of the star point 10 and sufficiently spaced therefrom to accommodate the star points 11, 25, and 13 therebetween. Thus the pointed ends of the star points are protected and somewhat enclosed during folded position thereof as indicated in Figure 3.

The indentations 36 are so arranged as to nest together when the various star points are in unfolded position as shown in Figure 2 of the drawings, or in folded position as indicated in Figure 3 of the drawings. Thus the various points of the star tend to remain in set condition either while the signal is in use or while the device is being stored.

A flat hook arm 40 extends on a plane intersecting the plane of the star point 10 at right angles. This arm 40 extends upwardly and outwardly from the pivotal center of the start point and is bent at 41 to provide a downwardly inclined hook flange 42. This flange 42 may engage inwardly of the edge of a vehicle door while the door is open and when the door is closed is clamped between the door edge and the body of the vehicle. Similarly the flange 42 may if desired be engaged in the drip trough extending longitudinally of the vehicle above the doors or may be engaged over the upper edge of a window if preferred.

The star points are each coated with a surface coating of a reflective or luminescent material. I have found that a covering of minute beads embedded in a cement produces a desirable effect. Both sides of the points are preferably coated so that the star may be seen equally well from either direction. The coatings on opposite sides of the signal may be of a single suitable color such as red, or the signal may be red on one side and orange, yellow, or some other suitable color on its opposite side. When thus arranged the red surface is usually arranged to provide a signal to cars approaching from the rear, while the other surface provides a warning for cars approaching from ahead.

If desired my safety signal may be used for various other purposes to provide warning of any obstruction along a highway or roadway, where it may be placed in the path of approaching lights. The shape of the signal similates a left handed star when viewed from one side and gives the impression of pointing away from the vehicle or directing approaching vehicles away from the parked car.

In accordance with the patent statutes, I have described the principles of construction and operation of my safety star warning signal, and while I have endeavored to set forth the best embodiment thereof, I desire to have it understood that obvious changes may be made within the scope of the following claims without departing from the spirit of my invention.

I claim:

1. A danger signal including a plurality of similar elements of sheet material each including a circular disc and a vane portion extending outwardly from a portion of the edge of the disc and on substantially the plane of the disc, a coating of light reflective material on said vane portions of said elements, said elements being arranged in parallel planes with the discs thereof in axial alignment, a pivot extending through the discs axially thereof to pivotally connect the same, a series of angularly spaced indentations in one surface of each disc providing corresponding projections on the opposite surface thereof, the indentations being equally spaced, equal in number to the number of elements, and equidistant from the disc axes, said projections of one disc being engageable in the indentations of the next adjacent disc, and spring means encircling said pivot and urging said discs toward surface contact with each other, the indentations and projections nesting together when said vanes are in equally spaced angular relation, and when said vanes are in contiguous relation.

2. The structure defined in claim 1 and in which one of said vanes attached to an outermost disc of the series includes a flange along one edge designed to extend along a corresponding edge of all of the vanes when the vanes are in contiguous relation.

3. The structure defined in claim 1 and including a hook shaped extension on one vane shaped to hook over an object extending substantially parallel to the axes of the discs.

LAWRENCE MERTIN WILFORD.

References Cited in the file of this patent

UNITED STATES PATENTS

| Number | Name | Date |
|---|---|---|
| 1,251,670 | Just | Jan. 1, 1918 |
| 1,813,102 | Vogel | July 7, 1931 |
| 1,838,693 | Luce | Dec. 29, 1931 |
| 2,484,142 | Arnold | Oct. 11, 1949 |
| 2,513,961 | Ostrom | July 4, 1950 |

FOREIGN PATENTS

| Number | Country | Date |
|---|---|---|
| 423,815 | Great Britain | Feb. 8, 1935 |